US012581017B2

(12) United States Patent
Sakalkar et al.

(10) Patent No.: US 12,581,017 B2
(45) Date of Patent: Mar. 17, 2026

(54) COMMUNICATION ROUTING FOR CONTACT CENTER

(71) Applicant: Cisco Technology, Inc., San Jose, CA (US)

(72) Inventors: Saurabh Vinayak Sakalkar, Hayward, CA (US); Aseem B. Asthana, Morgan Hill, CA (US); Sachin Gaikwad, San Ramon, CA (US); Arunabh Bhattacharjee, Etobicoke (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 108 days.

(21) Appl. No.: 18/473,864

(22) Filed: Sep. 25, 2023

(65) Prior Publication Data

US 2025/0106322 A1     Mar. 27, 2025

(51) Int. Cl.
*H04M 3/523*          (2006.01)

(52) U.S. Cl.
CPC ................................ *H04M 3/5232* (2013.01)

(58) Field of Classification Search
None
See application file for complete search history.

(56) References Cited

U.S. PATENT DOCUMENTS 8,130,935 B1 *    3/2012  Coughlan ........... H04M 3/5232
                                                              379/265.06
2007/0121824 A1    5/2007  Agapi et al.

2015/0092930 A1 *  4/2015  Mullen ............... H04M 3/4936
                                                              379/88.01
2016/0352900 A1   12/2016  Bell et al.
2018/0152560 A1    5/2018  Kumar et al.
2018/0205828 A1    7/2018  Conway et al.
2022/0067630 A1    3/2022  Asokan et al.
2022/0131975 A1    4/2022  Krishnan

OTHER PUBLICATIONS

Aws, "Amazon Connect Contact Lens," Call Center Speech Analytics, Retrieved on Jun. 27, 2023, 16 Pages, https://aws.amazon.com/connnect/contact-lens/.
Baniadamdizaj, S., et al., "Prediction of Iranian EFL Teachers' Burnout Level using Machine Learning Algorithms and Maslach Burnout Inventory," Iran Journal of Computer Science (2023) 6:1-12, Aug. 19, 2022, 12 pages, https://doi.org/10.1007/s42044-022-00112-x.

(Continued)

*Primary Examiner* — Nafiz E Hoque
(74) *Attorney, Agent, or Firm* — Edell, Shapiro & Finnan, LLC

(57)                    ABSTRACT

In an example embodiment, a method includes determining an attitudinal negativity score associated with a contact center agent, among a plurality of contact center agents, based on an interaction between the contact center agent and a user during a communication session, receiving data associated with an incoming user communication, determining a user ease score associated with the incoming user communication based on the data, and blocking routing of the incoming user communication to the contact center agent based on the attitudinal negativity score being above a first threshold score and the user ease score being below a second threshold score.

20 Claims, 7 Drawing Sheets

(56) References Cited

OTHER PUBLICATIONS

Khasnis, S., et al., "Provide Real-time Customer Sentiment Analytics to Agents Using Contact Lens API for Amazon Connect," Amazon Connect, AWS Contact Center, Jun. 24, 2021, 9 Pages, https://aws.amazon.com/blogs/contact-center/provide-real-time-customer-sentiment-analytics-to-agents-using-contact-lens-api-for-amazon-connect/.

Lee, Y-L., et al., "An App Developed for Detecting Nurse Burnouts Using the Convolutional Neural Networks in Microsoft Excel: Population-Based Questionnaire Study," JMIR Medical Informatics, vol. 8, No. 5, e16528, May 7, 2020, 19 Pages, DOI: 10.2196/16528: 10.2196/16528, https://ncbi.nlm.nih.gov/pmc/articles/PMC7243132/?report=printable.

Maslach, C., et al., "The Measurement of Experienced Burnout," Journal of Occupational Behavior, vol. 2, Apr. 1981, 15 pages, https://onlinelibrary.wiley.com/doi/epdf/10.1002/job.4030020205.

Mind Garden, "Maslach Burnout Inventory™ (MBI)", Manual 4th Edition, retrieved from the Internet on Sep. 15, 2023, 5 Pages, https://www.mindgarden.com/maslach-burnout-inventory-mbi/685-mbi-manual.html.

World Health Organization, "Burn-out an "Occupational Phenomenon": International Classification of Diseases," Departmental News, May 28, 2019, 2 Pages, https://www.who.int/news/item/28-05-2019-burn-out-an-occupational-phenomenon-international-classification-of-diseases.

Zhernova, P., et al., "Detection and Prevention of Professional Burnout Using Machine Learning Methods," 2020 IEEE 15th International Conference on Advanced Trends in Radioelectronics, Telecommunications and Computer Engineering (TCSET), pp. 218-221, Feb. 25-29, 2020, https://ieeexplore.ieee.org/document/9088596.

* cited by examiner

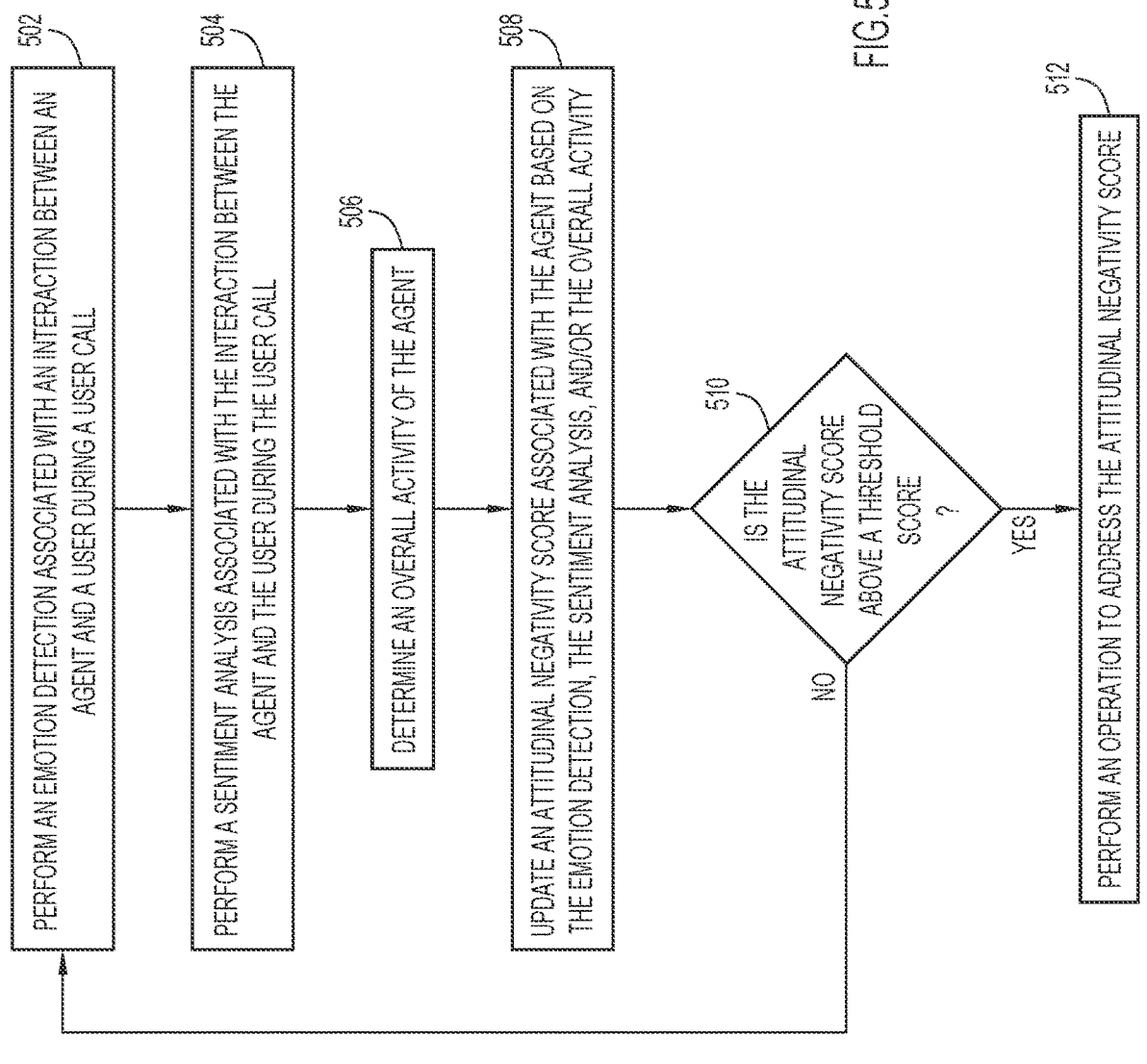

502 PERFORM AN EMOTION DETECTION ASSOCIATED WITH AN INTERACTION BETWEEN AN AGENT AND A USER DURING A USER CALL

504 PERFORM A SENTIMENT ANALYSIS ASSOCIATED WITH THE INTERACTION BETWEEN THE AGENT AND THE USER DURING THE USER CALL

506 DETERMINE AN OVERALL ACTIVITY OF THE AGENT

508 UPDATE AN ATTITUDINAL NEGATIVITY SCORE ASSOCIATED WITH THE AGENT BASED ON THE EMOTION DETECTION, THE SENTIMENT ANALYSIS, AND/OR THE OVERALL ACTIVITY

510 IS THE ATTITUDINAL NEGATIVITY SCORE ABOVE A THRESHOLD SCORE ?

NO

YES

512 PERFORM AN OPERATION TO ADDRESS THE ATTITUDINAL NEGATIVITY SCORE

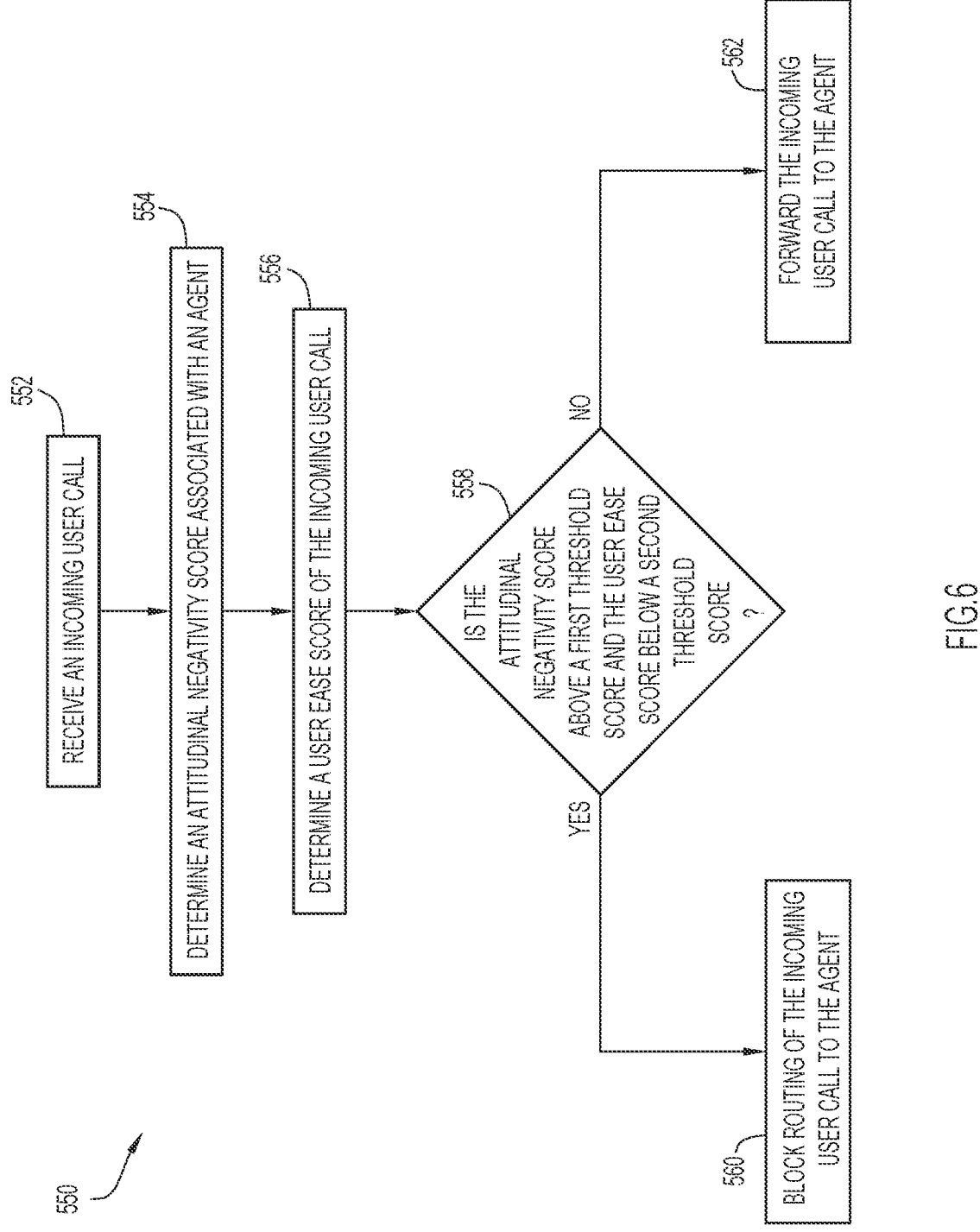

550

552 RECEIVE AN INCOMING USER CALL

554 DETERMINE AN ATTITUDINAL NEGATIVITY SCORE ASSOCIATED WITH AN AGENT

556 DETERMINE A USER EASE SCORE OF THE INCOMING USER CALL

558 IS THE ATTITUDINAL NEGATIVITY SCORE ABOVE A FIRST THRESHOLD SCORE AND THE USER EASE SCORE BELOW A SECOND THRESHOLD SCORE ?

YES

NO

560 BLOCK ROUTING OF THE INCOMING USER CALL TO THE AGENT

562 FORWARD THE INCOMING USER CALL TO THE AGENT

FIG.6

COMMUNICATION ROUTING FOR CONTACT CENTER

TECHNICAL FIELD

The present disclosure relates to communication routing.

BACKGROUND

A contact center is used to help provide solutions for different user inquiries and requests. For instance, a user (e.g., a customer) can initiate contact or an interaction with a human agent of the contact center to help address a possible issue, such as with respect to a product or service. It may be difficult to route a call to an appropriate agent to adequately resolve an issue to the satisfaction of a user. As an example, many different factors associated with agents and/or with the user may affect how well an agent can assist the user. For instance, different agents may interact differently and/or may possess varying expertise and knowledge of different issues. Thus, assigning an agent to a particular user may be a complex issue that is challenging to resolve.

BRIEF DESCRIPTION OF THE DRAWINGS

FIG. 5 is a flowchart of a method for performing an operation based on an attitudinal negativity score of an agent, according to an example embodiment.

FIG. 6 is a flowchart of a method for routing a call based on an attitudinal negativity score of an agent, according to an example embodiment.

DETAILED DESCRIPTION

Overview

Figure 1:
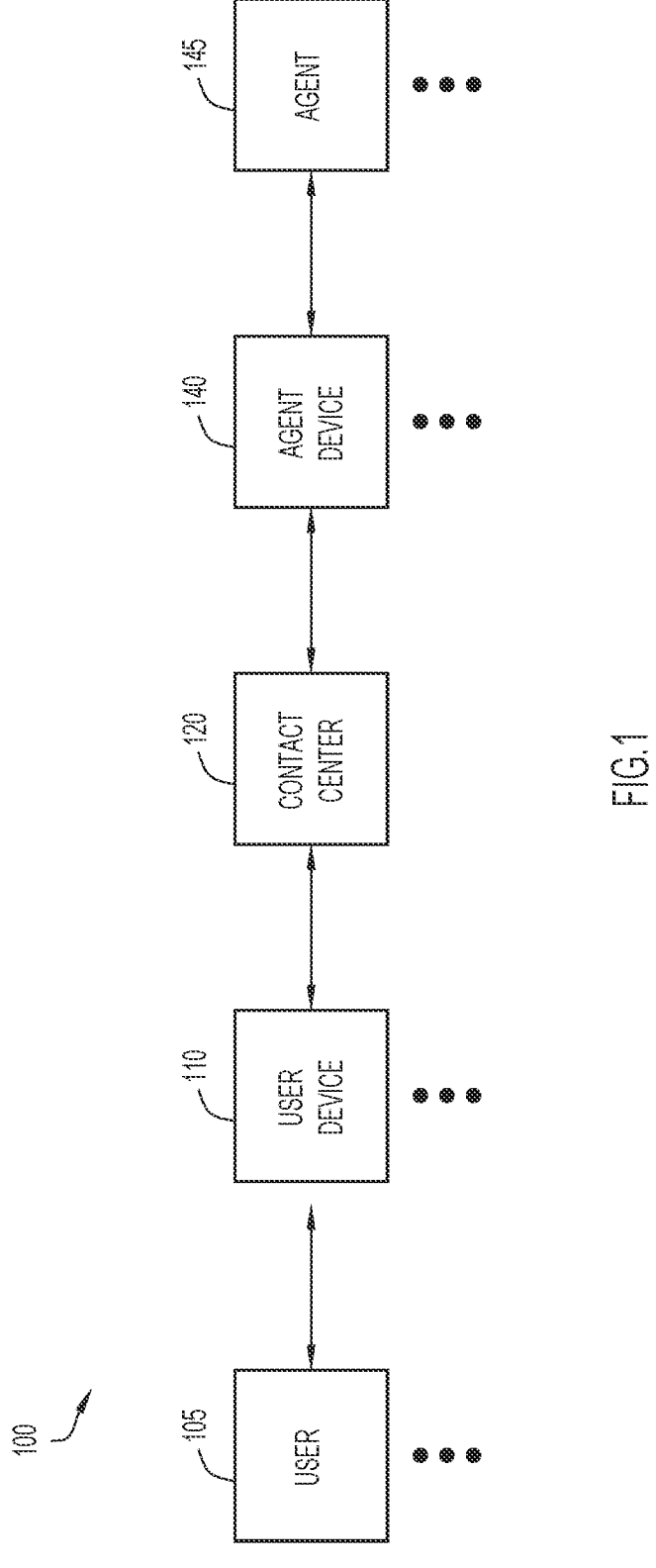
FIG. 1 is a block diagram of a contact center environment in which routing of communications may be implemented, according to an example embodiment.

In one example embodiment, a method includes determining an attitudinal negativity score associated with a contact center agent, among a plurality of contact center agents, based on an interaction between the contact center agent and a user during a communication session, receiving data associated with an incoming user communication, determining a user ease score associated with the incoming user communication based on the data, and blocking routing of the incoming user communication to the contact center agent based on the attitudinal negativity score being above a first threshold score and the user ease score being below a second threshold score.

Example Embodiments

Selection of contact center agents for handling user calls may be difficult. In some circumstances, for instance, while an agent may possess skills for addressing a particular issue, the agent may not be readily prepared to interact with a user at a given time. For example, the agent may be exhausted or stressed (e.g., as a result of one or more previous calls). Thus, routing a call to the agent may not result in addressing an issue for a user, even if the issue is related to the issue of which the agent is skilled at addressing. Additionally or alternatively, routing the call to the agent may negatively impact the performance of the agent. As a result, subsequent performance of the agent (e.g., to handle one or more subsequent calls) may be negatively affected.

Embodiments of the present disclosure provide improved call routing. An example embodiment includes determining an attitudinal negativity score of an agent and a user ease score of an incoming call to route the incoming call more suitably. The attitudinal negativity is indicative of a well-being of an agent and may suggest whether the agent can effectively interact with a user. An increased attitudinal negativity score may indicate that the wellbeing of the agent is low to suggest the agent may not currently be able to effectively interact with a user. The user ease score is indicative of a potential difficulty to interact with the user and/or to address an issue associated with an incoming call. For instance, an increased user ease score may indicate an issue is easier to address, such as because the user is potentially friendly and/or the issue has a clear solution.

A call is routed based on a comparison of the attitudinal negativity score and of the user ease score to respective thresholds. In some embodiments, an incoming call is blocked from being routed to a first agent based on the attitudinal negativity score of the first agent being above a first threshold score and the user ease score of the incoming call being below a second threshold score. That is, a potentially difficult call is blocked from being routed to the first agent, who may not currently be able to effectively interact with a user. Instead, the incoming call may be routed to a second agent having an attitudinal negativity score below the first threshold score and is currently able to effectively interact with a user. By routing the incoming call to the second agent instead of the first agent, the issue associated with the incoming call may be better addressed (e.g., because the second agent may more suitably interact with the user). Additionally, blocking the incoming call from being routed to the first agent may help improve the well-being of the first agent (e.g., by providing time for the first agent to mentally recover) so the first agent can be ready to effectively interact with a subsequent user. As such, routing of calls based on the attitudinal negativity score and the user ease score may help both agents and users.

While the present embodiments are described with respect to a contact center and identifying agents to handle incoming calls, it will be appreciated that the selection of agents may be performed for any type of communication center or physical or virtual site. Additionally, any suitable type of communication, such as a request and/or correspondence, as well as any suitable medium of communication, such as a chat, a message, a mobile text, an electronic mail, may be routed using the techniques discussed herein.

FIG. 1 illustrates a block diagram of an example contact center environment 100 in which an embodiment presented herein may be implemented. The contact center environment 100 includes one or more user devices 110 operated by users 105, as well as a contact center 120 to support call sessions or other interaction/communication sessions between the user devices 110 and corresponding agent devices 140 operated by respective contact center agents 145. The users 105 may initiate user calls with the contact center 120, and the contact center 120 may route the user calls to the agent devices 140 of the contact center agents 145, who may provide various support to the users 105 with respect to any issue (e.g., a request, an assistance), such as for a product or service. The user devices 110 and the agent devices 140 can take on a variety of forms, including a smartphone, a tablet, a laptop computer, a desktop computer, a video conference endpoint, a desk phone, a corresponding accessory (e.g., a headset), and the like.

The call session may be conducted over any suitable communication networks. For example, the communication networks may include one or more wide area networks (WANs), such as the Internet, one or more local area networks (LANs), and/or cellular or other telephony networks. The user devices 110 may communicate over the communication networks using a variety of known or hereafter developed communication protocols. For example, the user devices 110, the agent devices 140, and the contact center 120 may exchange Internet Protocol (IP) data packets, Realtime Transport Protocol (RTP) media packets (e.g., audio and video packets), and so on.

The contact center 120 may match the users 105 with the corresponding contact center agents 145 based on various parameters. For example, the contact center 120 may determine the issue related to an incoming call, communication, or interaction by a user 105 and identify a contact center agent 145 that has experience, knowledge, and/or skills for handling the issue. Additionally, the contact center 120 may determine an attitudinal negativity score associated with the contact center agent 145, as well as a user score associated with the incoming call to determine whether the incoming call is to be routed to the contact center agent 145. As an example, the contact center 120 may route the incoming call to the contact center agent 145 based on the attitudinal negativity score being below a first threshold score (e.g., indicating the contact center agent 145 is currently able to effectively interact with the user 105). As another example, the contact center 120 may route the incoming call to the contact center agent 145 based on the attitudinal negativity score being above the first threshold score, but the user ease score being above a second threshold score. That is, even though the contact center agent 145 may currently have limited capability of effectively interacting with the user 105 (e.g., indicated by the low attitudinal negativity score), the user 105 may be more easily helped (e.g., indicated by the high user ease score) such that the contact center agent 145 may still be able to address the issue related to the user 105, such as without further reducing the wellbeing of the contact center agent (e.g., increasing the attitudinal negativity score of the contact center agent 145). Consequently, the user 105 is helped, and the wellbeing of the contact center agent 145 is maintained or improved.

Additionally or alternatively, the contact center 120 may block routing of the incoming call to the contact center agent 145 based on the attitudinal negativity score being above the first threshold score and the user ease score being below the second threshold score. In such a situation, the contact center agent 145 may not currently be able to effectively interact with the user 105, and the user 105 may not be easily helped (e.g., indicated by the low user ease score). Thus, the contact center 120 may not route the incoming call to the contact center agent 145 to avoid potentially further reducing the wellbeing of the contact center agent 145, which may otherwise occur as a result of handling the potentially difficult incoming call. Instead, the contact center 120 may route the incoming call to a different contact center agent 145 (e.g., having a lower attitudinal negativity score) that may be more readily able to effectively interact with the user 105 and can therefore suitably help the user 105. As such, the selective routing of calls by the contact center 120 may enable the contact center agents 145 to help the users 105 while maintaining desirable wellbeing of the contact center agents 145.

Figure 2:
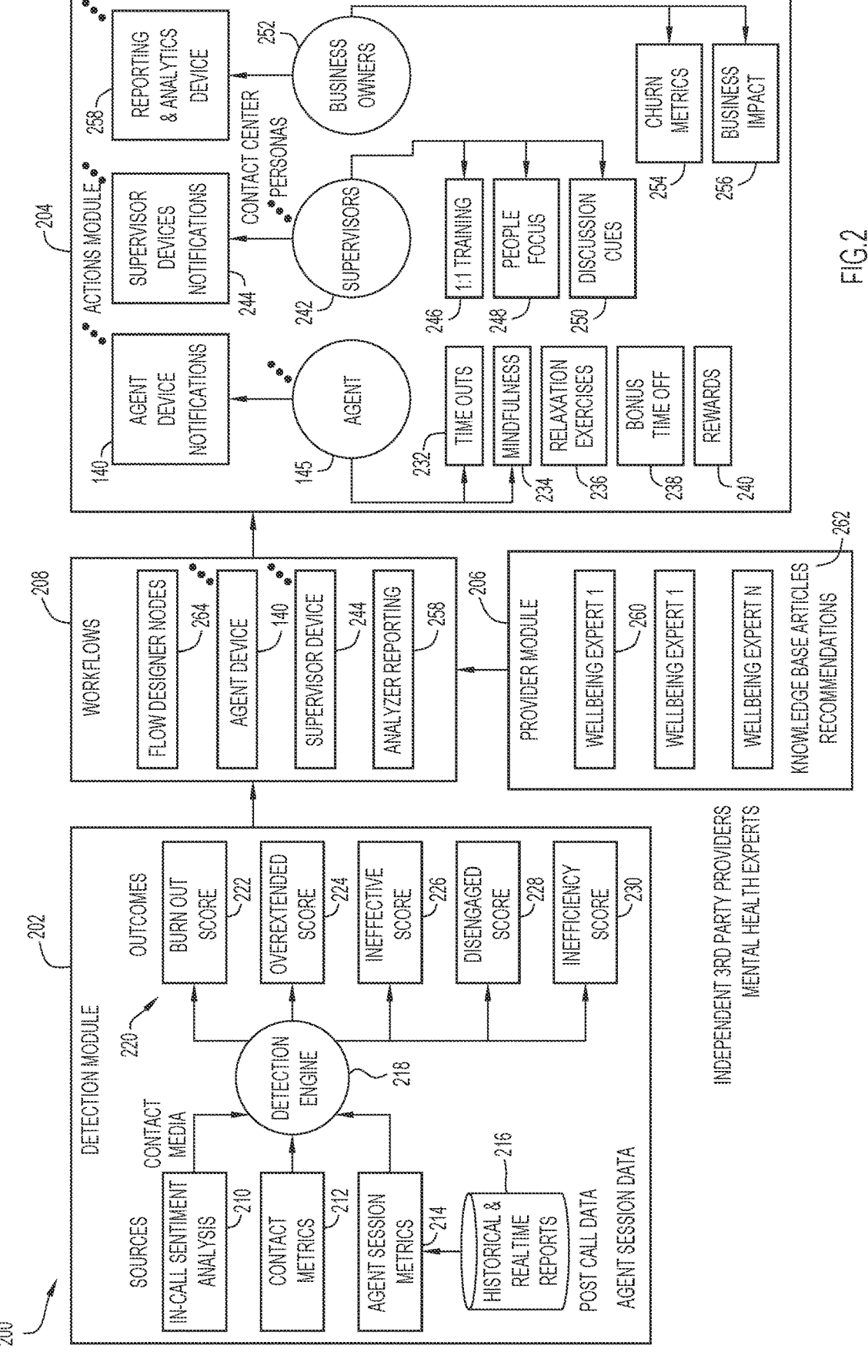
FIG. 2 is a block diagram of a system for performing an operation based on an attitudinal negativity score of an agent, according to an example embodiment.

FIG. 2 is a block diagram of a system 200 that may be utilized by a contact center for operating based on a wellbeing of a contact center agent 145, such as for improving the wellbeing of the contact center agent 145. The system 200 may include a detection module 202, an actions module 204, a provider module 206, and a workflow module 208. The detection module 202 may be configured to determine an attitudinal negativity score of a contact center agent 145, the attitudinal negativity score indicating a potential wellbeing (e.g., mental wellbeing) of the contact center agent 145. The detection module 202 may be configured to determine the attitudinal negativity score based on interactions between the contact center agent 145 and one or more users. To this end, the detection module 202 may be configured to receive data associated with such an interaction, such as a call session or other communication session between contact center agent 145 and a user. In one example, the detection module 202 may be configured to perform sentiment analysis 210 for a call session (e.g., in-call). Sentiment analysis 210 may include analyzing a textual transcript representative of the conversation between the contact center agent 145 and the user. For instance, the dialogue provided by the contact center agent 145 may be separated from the dialogue provided by the user. Such dialogue may then be processed to determine a general response resulting from the conversation, such as whether the conversation is positive (e.g., the user is satisfied), negative (e.g., the user is not satisfied), or neutral (e.g., the user is appeased). Indeed, the sentiment analysis 210 may include determining whether an issue has been resolved to identify a particularly determined sentiment. For example, a resolved issue may be associated with a positive sentiment, an issue resolution on hold may be associated with a neutral sentiment, and a clearly unresolved issue may be associated with a negative sentiment. Additionally or alternatively, more granular categories of the sentiment may be determined based on the text. By way of example, different types of a negative sentiment, such as toxic, obscene, insult, hate, and/or threat, may be determined. For a call session, the detection module 202 may be configured to convert audio (e.g., the dialogues spoken by the contact center agent 145 and by the user) into text to perform subsequent sentiment analysis 210 on the text.

The detection module 202 may also be configured to determine contact metrics 212 for a call session. The contact metrics 212 may include other feelings related to the interaction between the contact center agent 145 and the user that may not be easily detected via text alone. For example, contact metrics 212 may be determined by performing emotion detection for an interaction. The emotion detection may include more granular attitudes of the contact center agent 145 and/or of the user. For instance, emotions that are detectable may include happy, calm, frustrated, relieved, angry, impatient, sad, excited, scared, surprised, disgusted, fearful, and so forth. Emotion detection may be performed based on audio of a call session, including volume of speech, rate of speech, intonation, an amount of speech (e.g., between that provided by the contact center agent 145 and that provided by the user), and the like. As an example, louder dialogue may indicate presence of a more negative emotion, such as anger. As another example, a higher rate of speech may indicate presence of worry or anxiety. As a further example, a higher amount of speech provided by the user relative to that provided by the contact center agent 145 may indicate presence of fear or indifference by the contact center agent 145. Subsections of audio (e.g., audio clips) of the call session may be utilized for performing emotion detection for different interactions between the user and the contact center agent 145. The combination of sentiment analysis 210 based on text and contact metrics 212 based on audio may help determine a more representative outlook of the contact center agent 145 resulting from an interaction with the user.

The detection module 202 may further be configured to determine agent session metrics 214. The agent session metrics 214 may indicate overall performance and/or activity by the contact center agent across multiple call sessions. To this end, the detection module 202 may utilize historical information, such as that stored in a database 216. By way of example, the agent session metrics 214 may include a quantity/frequency of calls routed to the contact center agent 145, a quantity/frequency of customers helped by the contact center agent 145, a quantity/frequency of issues resolved by the contact center agent 145, a quantity/frequency of issues left unresolved by the contact center agent 145, a duration of calls, a duration of total time worked, a quantity of work days, and the like. Indeed, multiple call sessions and interactions with different users may cumulatively affect the wellbeing of the contact center agent 145. Such effects may be factored in via the agent session metrics 214. For instance, an elevated quantity of calls routed to the contact center agent 145 may increase a stress level, thereby reducing a wellbeing of the contact center agent 145. Additionally or alternatively, the agent session metrics 214 may indicate certain trends related to the interactions by the contact center agent 145. For example, the agent session metrics 214 may include sentiments and emotions related to other call sessions over time. Thus, the agent session metrics 214 may indicate a change in sentiments and emotions that may suggest the wellbeing of the contact center agent 145.

The detection module 202 may include a detection engine 218 configured to receive various information, including that related to the sentiment analysis 210, that related to the contact metrics 212, and/or that related to the agent session metrics 214, and determine an attitudinal negativity score 220 based on the information. In general, more emotionally deteriorating parameters, such as a negative sentiment indicated by the sentiment analysis 210, anger indicated by the contact metrics 212, and/or an elevated quantity of routed calls indicated by the agent session metrics 214, may increase the attitudinal negativity score 220. The information received by the detection engine 218 may be quantified and weighted to determine the attitudinal negativity score 220. By way of example, the contact metrics 212 may have a higher weight than the agent session metrics 214 such that the attitudinal negativity score 220 is more influenced by the contact metrics 212 (e.g., the attitudinal negativity score 220 may be high because the contact metrics 212 indicate presence of a negative emotion, even though the agent session metrics 214 do not indicate a high attitudinal negativity score 220). In certain embodiments, the weighting of the information received by the detection engine 218 may be established, configured, and/or adjusted by a user, such as a manager or supervisor of the contact center agent 145. Indeed, the importance of different aspects may vary for different situations, and the weighting may therefore be changed (e.g., manually changed) to be more suitable.

In certain embodiments, multiple attitudinal negativity scores 220 are determined. Each attitudinal negativity score

220 may be determined separately from one another, such as by using different weighting of the information related to the sentiment analysis 210, the information related to the contact metrics 212, and/or the information related to the agent session metrics 214. In the illustrated embodiment, different types of attitudinal negativity scores 220 include a burn out score 222, an overextended score 224, an ineffective score 226, a disengaged score 228, and an inefficiency score 230. The burn out score 222 may indicate a quantity or frequency of difficult users that have been interacting with the contact center agent 145. A high burn out score 222 may indicate potentially high tension of the contact center agent 145. For example, a quantity of consecutive call sessions that include a negative emotion (e.g., anger) being above a threshold quantity, as indicated by the agent session metrics 214 and as detected via sentiment analysis 210, may increase the burn out score 222. The overextended score 224 may indicate a quantity of call sessions (e.g., regardless of the associated detected emotions) within a period of time. A high overextended score 224 may indicate potentially high fatigue of the contact center agent 145. For instance, a quantity of call sessions within a period of time being above a threshold quantity, as indicated by the agent session metrics 214, may increase the overextended score 224. The ineffective score 226 may indicate how well the contact center agent 145 is resolving issues. A high ineffective score 226 may indicate reduced ability of the contact center agent 145 to help users. By way of example, a quantity of call sessions with unresolved issues being above a threshold quantity, as indicated by the agent session metrics 214 and detected by the contact metrics 212, may increase the ineffective score 226. The disengaged score 228 may indicate interaction actively provided by the contact center agent 145. A high disengaged score 228 may indicate increased disinterest by the contact center agent 145. In one example, a ratio of an amount (e.g., a duration, a quantity of words spoken) of speech provided by the user relative to an amount (e.g., a duration, a quantity of words spoken) of speech provided by the contact center being above a threshold value may increase the disengaged score 228. The inefficiency score 230 may indicate efficiency of the contact center agent 145 to complete a call session. A high inefficiency score 230 may indicate elevated mental weariness of the contact center agent 145. As an example, a call session with a duration that is above a threshold duration, as indicated by the agent session metrics 214, may increase the inefficiency score 230.

It should be noted that the attitudinal negativity scores 220 depicted herein are merely examples, and additional or alternative types of attitudinal negativity scores 220 may also be determined based on the information related to the sentiment analysis 210, the information related to the contact metrics 212, and/or the information related to the agent session metrics 214.

The actions module 204 may be configured to perform various operations. In some embodiments, the actions module 204 may be configured to perform operations related to the contact center agents 145. For instance, the actions module 204 may be communicatively coupled to the agent devices 140 and may be configured to operate the agent devices 140. As an example, the actions module 204 may perform a time out or downtime operation 232 to block calls from being forwarded to one of the agent devices 140. Thus, the time out operation 232 may provide a break for the corresponding contact center agent 145, such as to enable the contact center agent 145 to recuperate and recover (e.g., from a previously difficult call session, after completion of numerous call sessions). The actions module 204 may also perform a mindfulness operation 234 that may provide information that helps improve the wellbeing of the contact center agent 145. By way of example, the actions module 204 may provide the contact center agent 145 with a resource from outside of the contact center, such as to provide an article to the contact center agent 145 and/or to connect the contact center agent 145 with a wellbeing expert (e.g., a clinician, a therapist, a counselor). The actions module 204 may further perform a relaxation exercise operation 236 during which the actions module 204 may cause the agent device 140 to establish a more relaxing environment for the contact center agent 145. For instance, the actions module 204 may cause the agent device 140 to output an audio feature (e.g., relaxing music, breathing instructions) and/or a visual feature (e.g., soft lighting, a relaxing image). The environment established during the relaxation exercise operation 236 may improve the wellbeing of the contact center agent 145. In certain embodiments, the contact center agent 145 may continue to interact with users and complete call sessions while the relaxation exercise operation 236 is being performed.

The actions module 204 may further provide various incentives or compensation to improve the wellbeing of the contact center agent 145, such as by encouraging or motivating the contact center agent 145. In one example, the actions module 204 may perform a time off incentive operation 238 in which the actions module 204 may schedule a future time out or downtime during which no calls are forwarded to the contact center agent 145. As such, the contact center agent 145 may be more encouraged to continue completing call sessions with the upcoming break in mind. In another example, the actions module 204 may perform a reward operation 240 to provide the contact center agent 145 with a more immediate incentive. For instance, the actions module 204 may provide words of encouragement and/or monetary compensation (e.g., bonus pay). In some embodiments, the actions module 204 may establish a gamification associated with call sessions during the reward operation 240. By way of example, the actions module 204 may analyze the behavior and/or performance of the contact center agent 145 (e.g., a quantity of call sessions completed, a quantity of issues resolved, a quantity of satisfied users) and allocate a quantity of points based on the performance. The points may accumulate as the contact center agent 145 interacts with users during call sessions. The contact center agent 145 may use the points (e.g., after a threshold amount of points have been exceeded) to select a particular reward, such as paid leave, bonus pay, a gift card, and so forth. As such, the gamification aspect may incentivize the contact center agent 145 to continue to interact with users to accumulate points for a potential reward.

In any of these examples, the actions module 204 may operate the agent device 140 to effectuate the operation being performed. For example, the actions module 204 may cause the agent device 140 to provide a notification to inform the contact center agent 145 of the operation. Thus, the wellbeing of the contact center agent 145 may be more readily improved via the notification.

The actions module 204 may further be configured to perform operations related to a supervisor 242 of the contact center agent 145. To this end, the actions module 204 may be communicatively coupled to a supervisor device 244 of the supervisor 242. The supervisor device 244 can take on any suitable form, such as the same as or a different one than that of the contact center agent 145. The operations performed by the actions module 204 with respect to the supervisor 242 may prompt the supervisor 242 to help improve the wellbeing of the contact center agent 145. For example, the actions module 204 may perform a training operation 246 to inform the supervisor 242 to provide additional training to the contact center agent 145, such as assistance to resolve certain issues (e.g., in response to the ineffective score 226 being high). Additionally or alternatively, the actions module 204 may perform a people focused operation 248, which may notify the supervisor 242 to provide advice to the contact center agent 145 to improve interactions with users (e.g., in response to the burn out score 222 being high). For instance, the supervisor 242 may inform the contact center agent 145 on how to interact with difficult users. Furthermore, the actions module 204 may perform a discussions operation 250, which may cause the supervisor 242 to intervene the activity of the contact center agent 145 (e.g., in response to the disengaged score 228 being high). Such intervention may include words of encouragement or other conversations to help motivate the contact center agent 145 and/or to help the contact center agent 145 cope with certain negative emotions. The inclusion of the supervisor 242 to work with the contact center agent 145 may further help improve the wellbeing of the contact center agent 145. For any of such operations, the actions module 204 may operate the supervisor device 244 to provide a notification that informs the supervisor 242 of the operation being performed, thereby prompting the supervisor 242 to interact with the corresponding contact center agent 145 appropriately.

In certain embodiments, a call can also be routed to a supervisor 242. For instance, in an example circumstance, there may be no available agents 145 (e.g., all agents who currently are not in a call session have a high attitudinal negativity score 220) to which an incoming call or communication (e.g., chat message, email) can be routed. As a result, the incoming call may be routed to an available supervisor 242 of one of the unavailable agents 145. For this reason, the supervisor device 244 may be configured to provide a notification related to routing of an incoming call.

The actions module 204 may also be configured to perform operations related to a business owner 252, who may be overseeing the overall operation of the contact center. Thus, overall results related to call sessions (e.g., financial data), rather than the specific interaction provided by the contact center agents 145, may be more relevant to the business owner 252, and the operations performed by the actions module 204 may be related to such results. For example, the actions module 204 may perform certain relevant analyses, such as a churn metric analysis 254 and/or a business impact analysis 256. The churn metric analysis 254 may include determining information related to staffing of contact center agents 145 and/or of supervisors 242, such as a trend of a quantity of contact center agents 145 (e.g., whether there is a correlation between attitudinal negativity scores 220 and quantity of contact center agents 145). The business impact analysis 256 may include determining other information related to business operations, such as profit and/or quantity of incoming calls (e.g., in relation to the attitudinal negativity scores 220). Based on the churn metric analysis 254 and/or the business impact analysis 256, the actions module 204 may operate a reporting and analytics device 258 of the business owner 252 to provide a notification that informs the business owner 252 of the analyses. Thus, the business owner 252 may be aware of the effect of the attitudinal negativity scores 220 of the contact center agents 145 with respect to business operations and may perform a corresponding operation, such as to employ additional contact center agents 145 based on a trend of attitudinal negativity scores 220 (e.g., a sudden decrease of attitudinal negativity scores 220 may indicate a quantity of contact center agents 145 may be leaving).

Although specific operations available for performance by the actions module 204 are depicted in FIG. 2, it should be noted that any additional or alternative operation may be performed. For example, a different operation related to the contact center agent 145, the supervisor 242, and/or the business owner 252 may be performed (e.g., based on the attitudinal negativity scores 220). Moreover, the described operations may be performed for any suitable quantity of contact center agents 145, supervisors 242, and business owners 252, such as a plurality of each (e.g., with operations being performed simultaneously with one another). Additionally or alternatively, operations related to another entity of the contact center may be performed.

As discussed herein, resources outside of the contact center may be provided to the contact center agent 145 (e.g., during the mindfulness operation 234) to improve the wellbeing of the contact center agent 145. The provider module 206 may provide access to resources outside of the contact center. By way of example, the provider module 206 may be communicatively coupled to various wellbeing expert devices 260 and may operate to communicatively couple any of the various wellbeing expert devices 260 to one of the agent devices 140. Additionally or alternatively, the provider module 206 may be configured to store or access information 262, such as articles and/or recommendations, that may help improve the wellbeing of the contact center agent 145. The provider module 206 may be configured to readily provide such information 262 to the contact center agent 145 (e.g., via the agent device 140).

The workflow module 208 may operate to reduce the attitudinal negativity score 220 of the contact center agents 145 by utilizing the actions module 204 and/or the provider module 206. To this end, the workflow module 208 may include flow designer nodes 264 (rules) that provide an output based on a received input. For example, the workflow module 208 may receive an input related to the attitudinal negativity scores 220 from the detection module 202, and the flow designer nodes 264 may cause the workflow module 208 to effectuate operation of the actions module 204 based on the input. In some embodiments, the flow designer nodes 264 are adjustable (e.g., reconfigurable by an operator). Thus, performance of certain operations (e.g., by the actions module 204) may be changed to be more suitable, such as to improve the wellbeing of contact center agents 145 more effectively. In some embodiments, the workflow module 208 is communicatively coupled to the agent device(s) 140, the supervisor device(s) 244, and/or the reporting and analytics device(s) 258 and is configured to receive inputs therefrom to perform a suitable operation (e.g., based on the flow designer nodes 264). By way of example, the workflow module 208 may receive an input indicating that an agent device 140 is currently in use for a call session. Thus, the workflow module 208 may avoid causing the actions module 204 to transmit a certain notification to the agent device 140 to avoid distracting the contact center agent 145 using the agent device 140. Instead, for instance, the workflow module 208 may cause the actions module 204 to transmit a notification to the supervisor device 244 of the supervisor 242 of the contact center agent 145. Upon receiving an input indicating the agent device 140 is no longer in a call session, the workflow module 208 may transmit another notification to the agent device 140 and/or to the supervisor device 244, such as to inform the corresponding contact center agent 145 of the interaction sentiment (e.g., a negative sentiment indicative of a toxic caller) and/or to inform the supervisor 242 for intervention (e.g., after a toxic caller interaction).

Generally, the flow designer nodes 264 effectuate operations to improve the wellbeing of the contact center agents 145, such as by reducing the attitudinal negativity scores 220. For example, based on the flow designer nodes 264, the workflow module 208 may cause the actions module 204 to transmit a notification to an agent device 140 to reduce the attitudinal negativity score 220 of the corresponding contact center agent 145 in response to the attitudinal negativity score 220 being above a threshold score. In some embodiments, the attitudinal negativity score 220 may be monitored after the notification is transmitted to the agent device 140 to determine whether the notification was effective and to perform a subsequent operation. For instance, in response to determining the attitudinal negativity score 220 remains above threshold score after a duration of time has elapsed, the workflow module 208 may cause the actions module 204 to transmit an additional notification to the agent device 140 and/or to transmit a notification to the supervisor device 244. As such, multiple operations may be performed to try to improve (e.g., iteratively improve) the wellbeing of the contact center agent 145.

In some embodiments, each individual attitudinal negativity score 220 (e.g., the burn out score 222, the overextended score 224, the ineffective score 226, the disengaged score 228, the inefficiency score 230) may be compared to a respective threshold score. In such embodiments, based on any one of these attitudinal negativity score 220 being above its corresponding threshold score, an associated operation may be performed to address the particular elevated attitudinal negativity score 220. Indeed, different operations may be more effective at addressing different attitudinal negativity scores 220. For example, performing the time out operation 232 to block additional calls from being routed to a contact center agent 145 may effectively reduce the overextended score 224 of the contact center agent 145, but may not effectively reduce the disengaged score 228 of the contact center agent 145, whereas performing the reward operation 240 may effectively reduce the disengaged score 228 of the contact center agent 145, but may not effectively reduce the overextended score 224 of the contact center agent 145. Thus, based on the flow designer nodes 264, a suitable operation may be selected to address the particular attitudinal negativity score 220 more effectively. In additional or alternative embodiments, an overall or comprehensive attitudinal negativity score 220 is determined based on the attitudinal negativity scores 220. In other words, the attitudinal negativity scores 220 are combined (e.g., via an equation, via an algorithm) to provide a single, overall attitudinal negativity score 220. In such embodiments, based on the overall attitudinal negativity score 220 being above a threshold score, a subsequent operation may be performed to address the elevated overall attitudinal negativity score 220.

Figure 3:
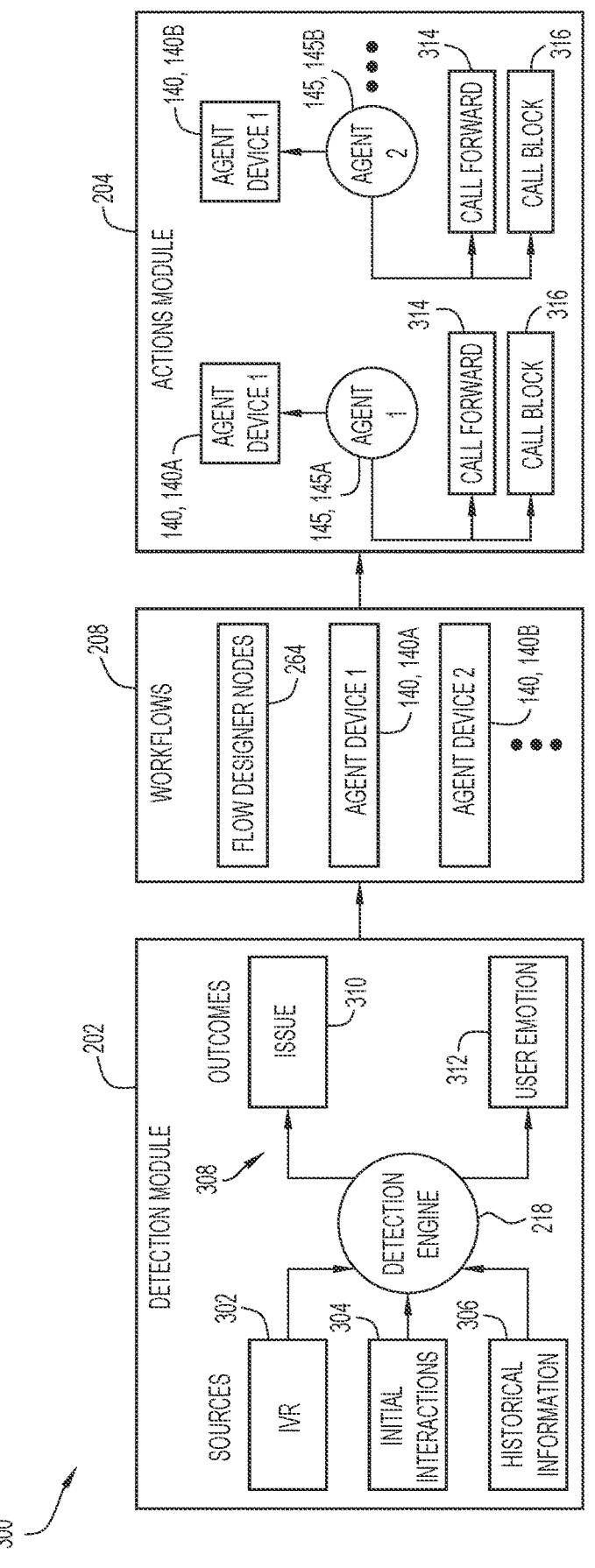
FIG. 3 is a block diagram of a system for performing an operation based on a user ease score of a user call, according to an example embodiment.

FIG. 3 is a block diagram of a system 300 that may be utilized by a contact center for operating based on a user ease score, such as for routing calls. The system 300 may include the detection module 202, the workflow module 208, and the actions module 204. The detection module 202 may be configured to determine a user ease score for an incoming call to be routed to an appropriate contact center agent 145. The user ease score may be indicative of a potential difficulty or easiness to interact with the user of the incoming call and/or to address the issue pertaining to the user. The detection module 202 may be configured to determine the user ease score based on various data related to the incoming call and/or to the user. As an example, the detection module 202 may be configured to monitor interactive voice response (IVR) metrics 302 related to the incoming call. That is, initiation of the call by the user may cause the user to connect to an IVR system that may automatically prompt the user to provide various information related to the call. For instance, the user may indicate an issue, a product/service, a department, and so forth, relevant to the call. In certain embodiments, the user may provide the indications using digital input, such as by selecting an icon, dialing a number, and the like. In additional or alternative embodiments, the user may provide the indications using audio input (e.g., speech). In such embodiments, the audio input may be analyzed (e.g., converted to text) to determine the corresponding indications. Moreover, in such embodiments, the audio output (e.g., spoken words, volume of speech, rate of speech, intonation) may be analyzed to determine an attitude of the user, such as whether the user appears to be angry, anxious, nervous, and so forth. The IVR metrics 302 may include such information determined based on an interaction between the user and an automated system.

Additionally or alternatively, the detection module 202 may be configured to determine initial interaction metrics 304 based on an initial interaction between the user and another human. For example, in addition to or as an alternative to interacting with the IVR system, the user may initially interact with a member of the contact center to provide information related to the incoming call. Such interaction may be analyzed to determine the reason for the call and/or the attitude of the user. For example, words spoken by the user and/or audio characteristics provided by the user may be analyzed. The initial interaction metrics 304 may include such information determined based on an interaction between the user and another human. Indeed, the manner in which the user interacts during the initial interaction may suggest how the user may interacts with a subsequent contact center agent 145.

Furthermore, the detection module 202 may be configured to determine historical information 306 related to the user. For instance, previous interactions by the user and/or previous user ease scores determined by the user may be stored (e.g., in association with an identifier, such as a phone number and/or an internet protocol (IP) number) and retrieved. The historical information 306 may indicate the attitude of the user in previous call sessions. As an example, the historical information 306 may indicate a previous behavior of the user (e.g., with a previous contact center agent 145) and may therefore suggest a potential behavior of the user in a subsequent interaction with a contact center agent 145. The historical information 306 may further include other metrics determined from previous calls, including an average hold duration, an average talk duration, an average queue time, an average self-service time, repeated call frequencies, another suitable metric, a trend of any suitable metric, or any combination thereof.

The detection engine 218 may receive the information determined by the detection module 202, including that related to the IVR metrics 302, that related to the initial interaction metrics 304, and/or that related to the historical information 306, and determine a user ease score 308 based on the information. More difficult issues (e.g., issues that are more difficult or take longer to resolve) and/or users associated with more negative emotions (e.g., anger) may reduce the user ease score 308. For example, the information received by the detection engine 218 may be quantified and weighted to determine the user ease score 308. Thus, certain information (e.g., initial interaction metrics 304) may have a greater influence or effect on the user ease score 308 as compared to other information (e.g., the historical information 306).

In certain embodiments, separate user ease scores 308 may be determined, such as based on different information that has been determined. As an example, an issue ease score 310 indicative of a difficulty associated with an issue related to the incoming call may be determined. For instance, different issues are associated with respective, corresponding issue ease scores 310, and the issue ease score 310 is selected based on a determined issue. Separately, a user emotion ease score 312 indicative of an emotional easiness of the user (e.g., a potential difficulty to interact with the user) may be determined. For example, different emotions or emotional levels are associated with respective user emotion ease scores 312, and the user emotion ease score 312 is selected based on the determined emotion. Such scores may, at least in some cases, be independent of one another. For instance, a particular incoming call may be related to a difficult issue and therefore may have a lower issue ease score 310. However, the user of the incoming call may be easy to interact with, and the incoming call may therefore have a higher user emotion ease score 312. In contrast, another incoming call may be related to an easy issue and therefore may have a higher issue ease score 310, but the user of the incoming call may be difficult to interact with such that the incoming call may have a lower user emotion ease score 312. Thus, the usage of the separate issue ease score 310 and the user emotion ease score 312 may help determine the easiness of the incoming call more suitably. In additional or alternative embodiments, other types of scores associated with user may be determined based on the information determined by the detection module 202.

The actions module 204 may be configured to perform various operations related to routing calls. For instance, the actions module 204 may be configured to selectively and dynamically route calls to a first contact center agent 145A and/or to a second contact center agent 145B. To this end, the actions module 204 may be communicatively coupled to a first agent device 140A of the first contact center agent 145A and communicatively coupled to a second agent device 140B of the second contact center agent 145B. For either contact center agent 145, the actions module 204 may be configured to perform a call forwarding operation 314 or a call blocking operation 316. During the call forwarding operation 314, the actions module 204 may communicatively couple the agent device 140 to the user device of an incoming call, thereby establishing a call session during which the contact center agent 145 is able to interact with the user. During the call blocking operation 316, the actions module 204 may actively block an incoming call from being forwarded to the agent device 140. For example, the contact center agent 145 may initially have been identified as being suitable for receiving an incoming call. However, during the call blocking operation 316, the incoming call may be blocked from being routed to the contact center agent 145 even though the contact center agent 145 was initially identified. In other words, although the contact center agent 145 may be identified as being suitable for a particular incoming call, the contact center agent 145 may be deemed unavailable for the particular incoming call during the call blocking operation 316.

The workflow module 208 may operate to route calls by utilizing the detection module 202 and/or the actions module 204. By way of example, the workflow module 208 may receive an input related to the user ease score 308 from the detection module 202, and the flow designer nodes 264 may cause the workflow module 208 to effectuate operation of the actions module 204 based on the user ease score 308. For instance, based on the flow designer nodes 264, the workflow module 208 may be configured to cause the actions module 204 to perform the call blocking operation 316 for the first contact center agent 145A for an incoming call with a low user ease score, thereby blocking the first agent device 140A from establishing a call session with the incoming call. However, the workflow module 208 may be configured to cause the actions module 204 to perform the call forwarding operation 314 for the second contact center agent 145B for the incoming call with the low user ease score, thereby establishing a call session between the second agent device 140B and the incoming call.

The workflow module 208 may also receive an input related to the attitudinal negativity score 220 and cause the actions module 204 to route calls based on the attitudinal negativity score 220. For example, the workflow module 208 may be configured to effectuate operations to route calls to avoid further increasing the attitudinal negativity score 220 beyond a first threshold. To this end, the workflow module 208 may be configured to cause the actions module 204 to route an easier incoming call to a contact center agent 145 with an elevated attitudinal negativity score 220. By way of example, based on the attitudinal negativity score 220 of the first contact center agent 145A being above the first threshold and the user ease score 308 of an incoming call being above a second threshold, the workflow module 208 may be configured to cause the actions module 204 to perform the call forwarding operation 314 for the first contact center agent 145A. Thus, even though the attitudinal negativity score 220 is high for the first contact center agent 145A, participating in a call session with the incoming call having the high user ease score 308 may not cause the attitudinal negativity score 220 to further increase (e.g., the first contact center agent 145A may more readily help the user such that the confidence of the first contact center agent 145A is increased, thereby causing the attitudinal negativity score 220 of the first contact center agent 145A to decrease). Additionally or alternatively, the workflow module 208 may be configured to cause the actions module 204 to block routing of a more difficult incoming call to a contact center agent 145 with an elevated attitudinal negativity score 220. For example, based on the attitudinal negativity score 220 of the first contact center agent 145A being above the first threshold and the user ease score 308 of an incoming call being below the second threshold, the workflow module 208 may be configured to cause the actions module 204 to perform the call blocking operation 316 for the first contact center agent 145A. Consequently, participation of the first contact center agent 145A in a call session with the incoming call having the low user ease score 308, which may otherwise cause the attitudinal negativity score 220 to further increase, is avoided.

Similar operations may also be performed for additional contact center agents 145. By way of example, the attitudinal negativity score 220 of a third contact center agent 145 may be determined (e.g., in response to determining the attitudinal negativity score 220 of the second contact center agent 145B is greater than the first threshold). Thus, a particular contact center agent 145 from any plurality of contact center agents 145 may be appropriately selected for an incoming call. To this end, the work flow module 208 may be communicatively coupled to any suitable quantity of agent devices 140 to effectuate operations to corresponding contact center agents 145 via the actions module 204. Further still, in a circumstance in which no contact center agent 145 is determined to be appropriate for routing of an incoming call (e.g., having a particular user ease score 308), the incoming call may be routed to a supervisor 242 of one of the contact center agents 145. As such, the workflow module 208 may also be communicatively coupled to any suitable quantity of supervisor devices 244.

Figure 4:
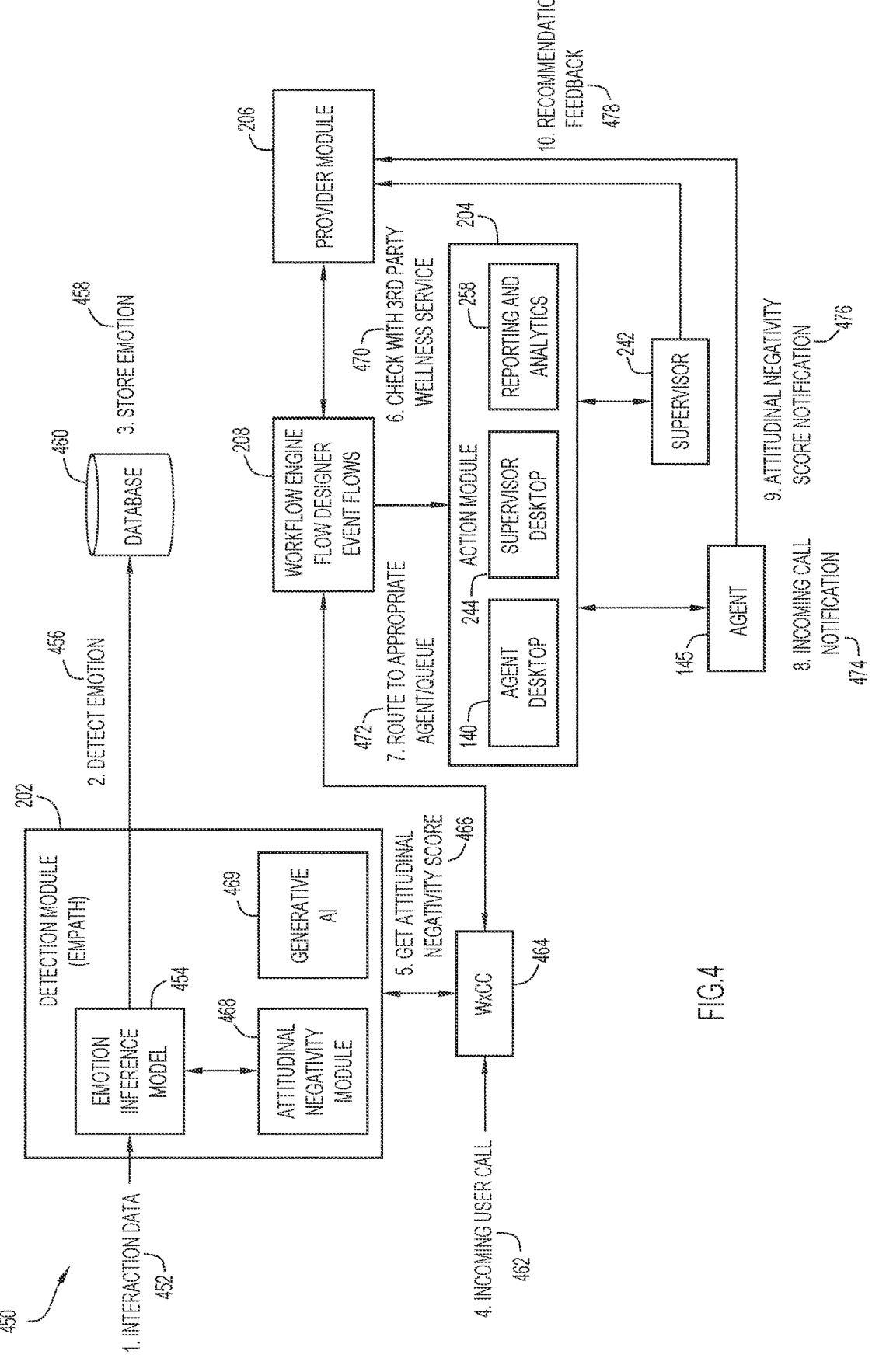
FIG. 4 is a diagram of a flow of operations of a contact center, according to an example embodiment.

FIG. 4 is a block diagram illustrating a flow 450 of operations for a contact center for a user call. At a first step 452, interaction data related to a call session between a contact center agent 145 and a user is received at the detection module 202. The interaction data may include audio data and/or text (e.g., converted from the audio). An emotion inference model 454 of the detection module 202 may be configured to receive the interaction data. At a second step 456, the emotion inference model 454 performs emotional analysis to determine the emotion related to the call session based on the interaction data. At a third step 458, the determined emotion is stored in a database 460 and is retrievable at a later time. For example, the determined emotion is associated with the user and/or with the contact center agent 145 of the call session within the database 460.

At a fourth step 462, an incoming user call is received by a call routing module 464 of the contact center. The incoming user call may be initiated by a user to communicate with the contact center. In certain embodiments, the call routing module 464 may be configured to receive data related to the incoming user call, such as an issue and/or information (e.g., an emotion) related to the user of the incoming user call, to enable the call to be routed appropriately. In such embodiments, the call routing module 464 may receive a user ease score of the incoming user call.

Additionally, at a fifth step 466, an attitudinal negativity score of the contact center agent 145 is determined by the detection module 202 and provided to the call routing module 464. For example, the detection module 202 may include an attitudinal negativity model 468 configured to receive the emotion determined at the second step 456, and the detection module 202 may be configured to determine the attitudinal negativity score based on the emotion via the attitudinal negativity model 468. The attitudinal negativity model 468 may additionally or alternatively be configured to determine the attitudinal negativity score based on other information, such as a sentiment associated with the call session and/or a performance by the contact center agent 145 (e.g., over time).

The illustrated detection module 202 may include a generative artificial intelligence (AI) model 469 that may help determine the emotion via the emotion inference model 454 and/or determine the attitudinal negativity score via the attitudinal negativity model 468. For example, the generative AI model 469 may determine patterns regarding how emotion is determined by the emotion inference model 454 and/or how attitudinal negativity scores are determined by the attitudinal negativity model 468. The generative AI model 469 may help determine new parameters, such as a parameter (e.g., a score) related to the attitudinal negativity score (e.g., a specific subset, such as burn out, of the attitudinal negativity score), a parameter related to emotion (e.g., a new type of emotion), and/or a parameter unrelated to the attitudinal negativity score or unrelated to emotion. The new parameters determined by the generative AI model 469 may enable a more suitable operation to be performed, such as to route a call and/or reduce the attitudinal negativity score more effectively.

The call routing module 464 may provide the collected information to the workflow module 208, and the workflow module 208 may be configured to effectuate an operation based on the information received from the call routing module 464. For example, at a sixth step 470, the provider module 206 may be utilized. The provider module 206 may have resources for improving a wellbeing of the contact center agent 145. For instance, based on the attitudinal negativity score of the contact center agent 145 being above a first threshold, the workflow module 208 may utilize a resource of the provider module 206 to reduce the attitudinal negativity score of the contact center agent 145.

Furthermore, at a seventh step 472, the incoming call is routed or queued appropriately. As an example, the workflow module 208 may cause the actions module 204 to perform an operation to forward the call and/or block the call from being forwarded to the contact center agent 145. In some embodiments, based on the attitudinal negativity score of the contact center agent 145 being below the first threshold, the incoming call may be forwarded to the contact center agent 145. Consequently, at an eighth step 474, an incoming call notification is provided to the contact center agent 145. For instance, the agent device 140 of the contact center agent 145 may be communicatively coupled to the user device to establish a call session. Additionally or alternatively, certain information may be provided to the contact center agent 145, such as reference material (e.g., a help video to resolve an issue), incoming call information (e.g., based on an interaction between the user and an IVR system), and so forth. In contrast, based on the attitudinal negativity score of the contact center agent 145 being above the first threshold, the incoming call may not be forwarded to the contact center agent 145 to avoid further increasing the attitudinal negativity score. Instead, the incoming call may be forwarded to a different contact center agent 145. For example, the attitudinal negativity score of the different contact center agent 145 may be determined in response to the incoming call being initially blocked from forwarding to the contact center agent 145, and the call may be forwarded to the different contact center agent 145 based on the different contact center agent 145 having an attitudinal negativity score below the first threshold. In certain embodiments, the incoming call may still be forwarded to the contact center agent 145 even though the attitudinal negativity score of the contact center agent 145 is above the first threshold. By way of example, the user ease score of the incoming call is below a second threshold. Thus, participation by the contact center agent 145 in the incoming call may not further increase the attitudinal negativity score. As such, the contact center agent 145 may be able to adequately help the user despite the elevated attitudinal negativity score. Such operation of the workflow module 208 to route calls may enable a more suitable contact center agent 145 to address an incoming call, such as to resolve an issue without compromising the wellbeing of the contact center agent 145.

At a ninth step 476, the supervisor 242 of the contact center agent 145 is provided with a notification related to the attitudinal negativity score of the contact center agent 145. In some embodiments, the notification related to the attitudinal negativity score may be provided based on the attitudinal negativity score being above the first threshold. As such, the supervisor 242 may be prompted to perform a corresponding action, such as to intervene the activity of the contact center agent 145, to avoid further increases of the attitudinal negativity score.

In some circumstances, the incoming call may be forwarded to the supervisor 242, such as in response to a determination that no suitable contact center agent 145 is available (e.g., has a sufficiently low attitudinal negativity score). As a result, an incoming call notification may be provided to the supervisor 242, the supervisor device 244 may be communicatively coupled to the user device, certain information may be provided to the supervisor 242, and so forth.

In certain embodiments, resources related to the provider module 206 may be provided to the contact center agent 145 and/or to the supervisor 242 to improve a wellbeing of the contact center agent 145 (e.g., to reduce the attitudinal negativity score). For example, the resources may include recommendations (e.g., coping mechanisms, discussion cues, training advice) that can urge various actions to be performed. In such embodiments, the contact center agent 145 and/or the supervisor 242 may be prompted to provide feedback regarding the effectiveness of the resources. In additional or alternative embodiments, the actions module 204 may perform a different operation, such as to provide encouragement and/or a reward. In any of these embodiments, the actions module 204 may utilize generative AI (e.g., a generative AI model) to perform the suitable operation, such as to generate a new type of operation suitable for the particular agent (e.g., based on the attitudinal negativity score of the agent, based on the issues encountered by the agent, based on an emotion of the agent, based on an interaction between the agent and the user).

At a tenth step 478, recommendation feedback provided by the contact center agent 145 and/or by the supervisor 242 is received by the provider module 206. The provider module 206 may use the recommendation feedback to adjust the manner in which resources are provided. In an example, a certain contact center agent 145 may indicate that an article with recommendations for a behavioral change to manage stress was useful to reduce the attitudinal negativity score. In response, an operation to provide articles to the contact center agent 145 is reinforced, and a subsequent article with recommendations for another behavioral change may be provided to the contact center agent 145 at another instance to reduce the attitudinal negativity score. In another example, a supervisor 242 may indicate that interaction with a wellbeing expert was not helpful to reduce the attitudinal negativity score of a contact center agent 145. In response, an operation to establish an interaction with another wellbeing expert is avoided. Instead, for example, an article may be provided to reduce the attitudinal negativity score. As such, the actions module 204 may utilize machine learning to adjust performance of operations to reduce the attitudinal negativity score based on the feedback provided by the contact center agent 145 and/or by the supervisor 242, thereby enabling a more suitable or effective operation to be performed.

Each of FIGS. 5 and 6 discussed below illustrates a respective method for operating in association with an attitudinal negativity score. In some embodiments, each method may be performed by a single entity. In additional or alternative embodiments, the operations of each method may be performed by different entities. It should also be noted that the operations of the methods may be performed differently than depicted. For example, an additional operation may be performed for either of the methods, and/or an operation may be performed in a different manner, an operation may not be performed, and/or an operation may be performed in a different order. Moreover, respective operations of the methods may be performed in any suitable manner with respect to one another, such as sequentially or in parallel (e.g., simultaneously).

FIG. 5 is a flowchart of a method 500 for performing an operation based on an attitudinal negativity score. At step 502, emotion detection associated with an interaction between an agent and a user during a user call or interaction (e.g., chat session) is performed. In some embodiments, emotion detection may be performed based on audio data, such as speech characteristics of the user and/or of the agent. Such speech characteristics may include volume, rate, into- nation, amount, and so forth. The detected emotion may include a more negative connotation (e.g., angry), a more positive connotation (e.g., happy), and/or a more neutral connotation (e.g., relieved).

At step 504, sentiment analysis associated with the inter- action between the agent and the user during the user call is performed. Sentiment analysis may be performed based on the words exchanged between the agent and the user. For example, audio data of the user call may be converted to text (e.g., a textual transcript), and the text may be analyzed to determine the context of the interaction between the agent and the user. A positive, negative, or neutral sentiment may then be determined based on the context. For instance, the sentiment may be based on whether the user appears to be satisfied (e.g., based on whether an issue has been resolved).

At step 506, an overall activity of the agent is determined. The overall activity of the agent may be associated with multiple user calls. By way of example, the overall activity may include a quantity of user calls completed and/or partaken by the agent (e.g., over a period of time), a quantity of issues resolved by the agent (e.g., over a period of time), a duration of user calls, a duration of total time worked, a quantity of work days, and so forth. In this way, the overall activity may include historical information to factor in previous user calls.

At step 508, an attitudinal negativity score associated with the agent is updated based on the emotion detection, senti- ment analysis, and/or overall activity (e.g., via an algorithm, via a weighted equation). The attitudinal negativity score may indicate a wellbeing of the agent in that a lower attitudinal negativity score corresponds to a better wellbeing and a higher attitudinal negativity score corresponds to a worse wellbeing. As an example, a more negative emotion being detected and/or a more negative sentiment being determined may result in a lower attitudinal negativity score. As another example, a potential deterioration of perfor- mance of the agent indicated by the overall activity may result in a lower attitudinal negativity score. For instance, an elevated quantity of user calls partaken by the agent (e.g., potentially suggesting higher stress), a decrease in quantity of issues resolved by the agent (e.g., potentially suggesting reduced effectiveness), and/or an elevated duration of user calls (e.g., potentially suggesting greater fatigue) may cause a lower attitudinal negativity score to be determined. As such, different emotions, sentiments, and/or agent activities are associated with respective, corresponding values, and an equation may be used to calculate the attitudinal negativity score based on the values corresponding to determined emotions, sentiments, and/or agent activities. In some embodiments, a new attitudinal negativity score may be generated based on each emotion detection performance, each sentiment analysis performance, and/or each overall activity determination. In additional or alternative embodi- ments, a previously existing attitudinal negativity score may be adjusted based on the emotion detection performance, the sentiment analysis performance, and/or the overall activity determination.

At step 510, a determination is made regarding whether the attitudinal negativity score is above a threshold score. The attitudinal negativity score being above the threshold score threshold score may indicate an undesirably low wellbeing of the agent (e.g., corresponding to reduced performance of the agent). Thus, the comparison between the attitudinal negativity score and the threshold score may indicate whether the wellbeing of the agent is sufficient (e.g., to maintain desirable performance).

In response to a determination that the attitudinal nega- tivity score is above the attitudinal negativity score, at step 512, an operation may be performed to address the attitu- dinal negativity score. For example, the operation may be performed to try to reduce the attitudinal negativity score below the threshold score. In certain embodiments, the operation being performed may include blocking calls from being forwarded to the agent for a threshold duration of time, thereby enabling the agent to recover or recuperate. In additional or alternative embodiments, the operation being performed may include providing the agent with various matters to help manage the attitudinal negativity score. Examples may include information (e.g., an article) to help the agent with coping or adjusting other behaviors, an interaction with a wellbeing expert to manage a behavior and/or mindset, and/or features that establish a more relax- ing environment for the agent. In further embodiments, the operation being performed may include providing the agent with motivations or incentives, which may help decrease the attitudinal negativity score. Such motivations may include scheduled breaks or times off, words of encouragement, and/or monetary benefits. Further still, in some embodi- ments, the operation being performed may include notifying a supervisor of the agent (e.g., via the supervisor device) of the elevated attitudinal negativity score. The notification to the supervisor may prompt the supervisor to intervene and work with the agent, such as by providing training, advice, and/or motivation. Any other suitable operation may addi- tionally or alternatively be performed to address the attitu- dinal negativity score.

In certain embodiments, different attitudinal negativity scores are provided based on the emotion detection perfor- mance, the sentiment analysis performance, and/or the over- all activity determination. For instance, the different attitu- dinal negativity scores are associated with different types of wellbeing (e.g., burn out level, overextended level, effec- tivity, disengagement, inefficiency). In such embodiments, each particular attitudinal negativity score may be associated with a corresponding operation that may effectively address the particular attitudinal negativity score (e.g., and not another one of the attitudinal negativity scores). Thus, an operation may be selected and performed based on the particular attitudinal negativity score that is above the threshold score. Consequently, the attitudinal negativity score may be more effectively and granularly addressed.

Additionally, in some embodiments, the attitudinal nega- tivity score may be reset or decreased after performing the operation. For example, after a duration of time in which calls are blocked from forwarding to the agent has elapsed, the attitudinal negativity score may be newly generated based on a subsequent user call partaken by the agent. In additional or alternative embodiments, the previous attitu- dinal negativity score remains unchanged after the operation is performed. Thus, the previous attitudinal negativity score may be updated as a result of a subsequent user call.

In contrast, in response to a determination that the atti- tudinal negativity score is not above the threshold score, no operation may be performed to address the attitudinal nega- tivity score. Instead, the attitudinal negativity score may continue to be updated. For example, during a subsequent call in which the agent interacts with an additional user, emotion detection and/or sentiment analysis for the subse- quent call is performed. Moreover, an overall activity of the agent may be re-determined. The updated attitudinal negativity score may be determined based on the subsequent emotion detection performance, the subsequent sentiment analysis performance, and/or the subsequent overall activity determination, and the updated attitudinal negativity score may be compared to the threshold score. As such, the attitudinal negativity score may be continually updated and monitored as the agent partakes in additional user calls. Further, in some embodiments, an operation may also be performed in response to a determination that the attitudinal negativity score is below the threshold score. The performance of such an operation may help maintain the attitudinal negativity score to avoid an increase of the attitudinal negativity score above the threshold score. By way of example, the operation may include providing a motivation and/or incentive to encourage the agent. Thus, a future occurrence in which the attitudinal negativity score of the agent exceeds the threshold score may be avoided.

Although the present embodiment indicates a determination of whether the attitudinal negativity score is above a single threshold score, in some embodiments, an additional or alternative analysis of the attitudinal negativity score may be performed to determine whether the attitudinal negativity score is to be addressed. As an example, the attitudinal negativity score may be compared with multiple different threshold scores or ranges, and each threshold score is related to a different state of the wellbeing of the agent. For instance, a lower threshold score may indicate a neutral wellbeing, an intermediate threshold score may indicate a below average wellbeing, and a higher threshold score may indicate a concerning wellbeing. A particular operation may be performed based on the specific threshold score exceeded by the attitudinal negativity score. To this end, each threshold score is associated with a corresponding, respective operation, and an operation is selected for performance accordingly. For example, based on the attitudinal negativity score exceeding the intermediate threshold score but being below the higher threshold score, an operation to block calls from being forwarded to the agent may be performed. However, based on the attitudinal negativity score exceeding the higher threshold score, the supervisor of the agent may be informed to prompt intervention. In this manner, initial operations (e.g., more moderate operations) may be performed to address a slightly elevated attitudinal negativity score, and additional operations (e.g., more intensive operations) may be performed to address a more significantly elevated attitudinal negativity score. Thus, the wellbeing of the agent may be more suitably addressed based on the degree of the attitudinal negativity score.

As another example, a rate or trend of the attitudinal negativity score may be determined, and an operation may be performed to address the attitudinal negativity score based on the rate exceeding a threshold rate. For instance, even though the attitudinal negativity score may be below the threshold score, the attitudinal negativity score may be sharply increasing toward the threshold score. Thus, an operation may be preemptively performed to address the attitudinal negativity score. In other words, the operation is performed to avoid the attitudinal negativity score potentially being elevated in the future. As a result, worsening of the wellbeing of the agent may be halted prior to possibly being below a desirable level.

FIG. 6 is a flowchart of an embodiment of a method 550 for routing a call based on an attitudinal negativity score. At step 552, an incoming user call or other communication (e.g., chat message) is received. For example, the incoming user call is initiated by a user to request for assistance to address an issue, and the user call is to be routed to an appropriate agent to enable the agent to interact with the user to help address the user. In such embodiments, a list of possible agents may be determined, such as based on each agent of the list being readily able to interact with the user (e.g., each agent of the list is not currently on a user call or otherwise helping another user) and having the skill, knowledge, and/or experience regarding the issue of the user call.

At step 554, an attitudinal negativity score associated with an agent is determined. For instance, the attitudinal negativity score may be determined in the manner described with respect to FIG. 5, such as by performing emotion detection, performing sentiment analysis, and/or determining an overall activity of the agent.

At step 556, a user ease score of the incoming user call is determined. The user ease score is indicative of a potential difficulty of the user call, such as related to interacting with the user and/or resolving the issue of the user call. For this reason, the user ease score may be determined based on the issue of the user call and/or an emotion of the user. As an example, a more difficult issue and/or a more negative emotion of the user (e.g., to indicate a potentially higher difficulty to interact with the user) may reduce the user ease score. The user ease score may be determined based on an interaction between the user and an IVR system, an initial interaction between the user and another human, and/or historical information of the user. As an example, different issues and/or emotions are associated with respective, corresponding values, and an equation may be used to calculate the user ease score based on the values corresponding to determined issues and/or emotions.

At step 558, a determination is made regarding whether the attitudinal negativity score is above a first threshold score and the user ease score is below a second threshold score. For example, the attitudinal negativity score being above the first threshold score may indicate that the wellbeing of the agent may be low, and the user ease score being below the second threshold score may indicate that the incoming user call may be difficult and may potentially further increase the attitudinal negativity score of the agent (e.g., further reduce the wellbeing of the agent). As such, at step 560, in response to a determination that the attitudinal negativity score is above the first threshold score and the user ease score is below the second threshold score, the routing of the incoming user call to the agent is blocked. Consequently, the attitudinal negativity score of the agent may be blocked from potentially increasing as a result of the incoming user call.

In some embodiments, in response to blocking of the routing of the incoming user call to the agent, further analysis may be performed to identify an appropriate agent to which the incoming user call may be routed. By way of example, an attitudinal negativity of an additional agent may be determined in response to blocking of the routing of the incoming user call to the agent. The incoming user call may be routed to the agent based on the attitudinal negativity of the additional agent being below the first threshold. In this manner, upon blocking of the routing of the incoming user call to the agent, a subsequent agent having a sufficiently low attitudinal negativity score may identified to forward the incoming user call to the subsequent agent. As such, an incoming user call may be selectively and dynamically routed to a more suitable agent for handling the incoming user call (e.g., based on the attitudinal negativity scores of agents, as well as the user ease score of the incoming user call). In some circumstances, a determination may be made that no agents are suitable for routing of the incoming user call. As an example, all agents may already be in respective call sessions. As another example, each agent who is not in a respective user call may have a high attitudinal negativity score. In such a circumstance, a supervisor of one of the agents may be identified, and the incoming user call may be routed to the supervisor. In this manner, instead of forcing the incoming user call to an agent (e.g., an unsuitable agent), the incoming user call may be routed to the supervisor, who may be able to better address the incoming user call.

However, in response to a determination that the attitudinal negativity score is not above the first threshold score and/or the user ease score is not below the second threshold score, at step 562, the incoming user call may be forwarded to the agent. For instance, the attitudinal negativity score being below the first threshold score may indicate that the wellbeing of the agent may be sufficiently high. Thus, the agent may be able to effectively interact with the user of the incoming user call to address issue of the incoming user call and/or the wellbeing of the agent may not subsequently deteriorate to an undesirably low level regardless of the difficulty of the incoming user call. Moreover, the user ease score being below the second threshold score may indicate that the incoming user call may be relatively easy to address. As such, the agent may be able to handle the incoming user call without a further increase to the attitudinal negativity score. For this reason, the incoming user call may be addressed by the agent without significantly deteriorating the wellbeing of the agent.

In certain embodiments, a user call may also be transferred between agents during an interaction between one of the agents and the user of the user call. By way of example, the attitudinal negativity score of a first agent initially interacting with the user may be monitored and determined to exceed the first threshold during the user call. As such, the first agent may no longer be able to effectively interact with the user and handle the issue of the user call (e.g., even though the first agent may initially have been able to interact with the user and handle the issue prior to receipt of the user call). Accordingly, the attitudinal negativity score of a second agent may be determined, and the user call may be transferred to the second agent based on the attitudinal negativity score of the second user being below the first threshold. In other words, the user call may be transferred to an agent that can potentially handle the user call more effectively. In some embodiments, the second agent may include a supervisor of the first agent. That is, based on the attitudinal negativity score of the first agent exceeding the first threshold during the user call, a supervisor of the first agent may be identified, and the user call may be routed to the supervisor, who may have a better capability to handle the user call. In any of these examples, a user call may be selectively re-routed to enable the user call to be effectively completed by an appropriate agent.

Figure 7:
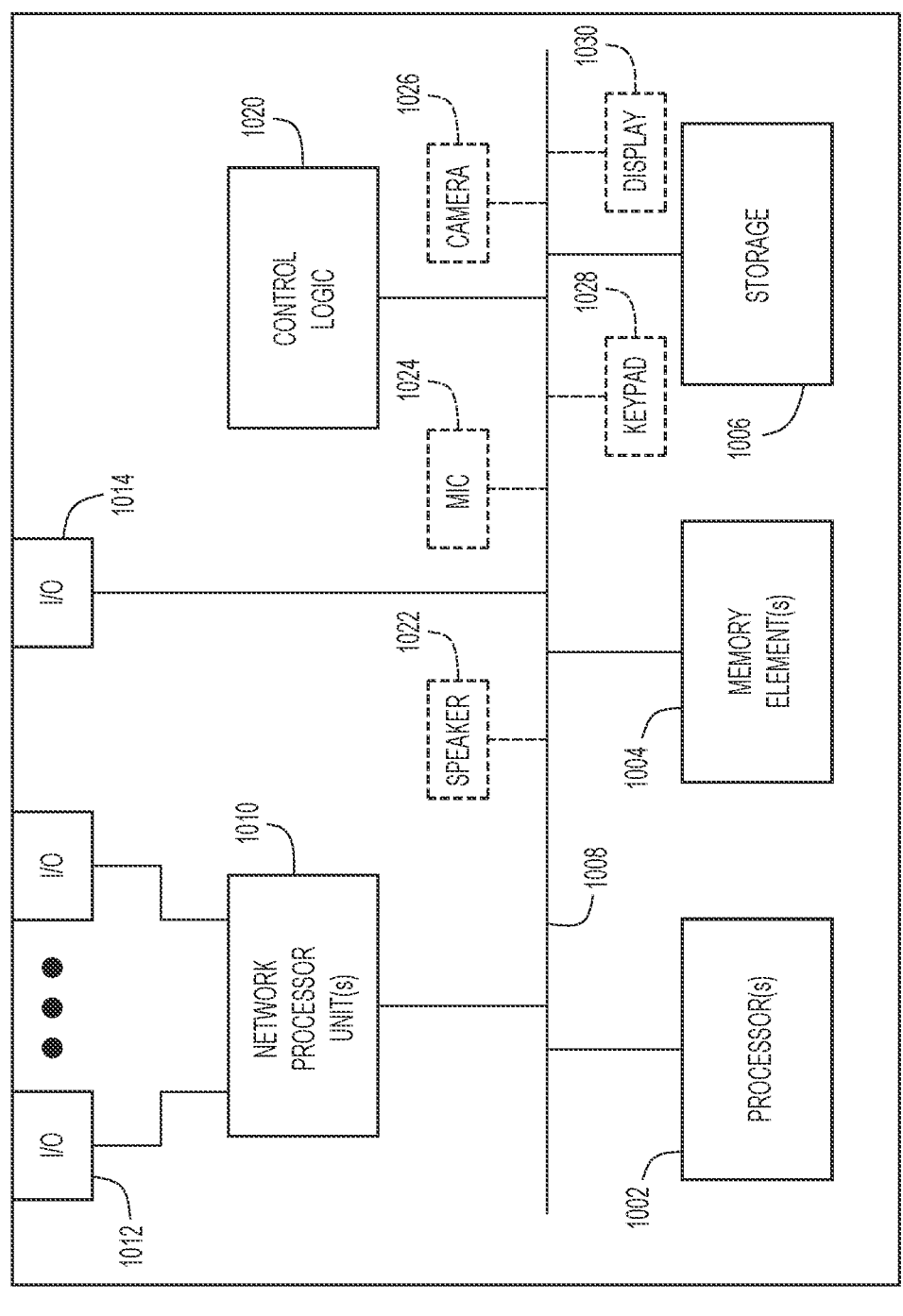
FIG. 7 illustrates a hardware block diagram of a computing device configured to perform functions associated with routing communications as discussed herein, according to an example embodiment.

FIG. 7 illustrates a hardware block diagram of a computing device 1000 that may perform functions associated with operations discussed herein in connection with the techniques depicted in FIGS. 1-6. In various embodiments, a computing device or apparatus, such as the computing device 1000 or any combination of the computing devices 1000, may be configured as any device entity/entities (e.g., computer devices, supervisor or other server systems, endpoint devices, etc.) as discussed for the techniques depicted in connection with FIGS. 1-6 in order to perform operations of the various techniques discussed herein.

In at least one embodiment, the computing device 1000 may be any apparatus that may include one or more processor(s) 1002, one or more memory element(s) 1004, a storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for the computing device 1000 can overlap in any manner and are not limited to the specific allocation of instructions and/or operations described herein.

In at least one embodiment, the processor(s) 1002 is/are at least one hardware processor configured to execute various tasks, operations, and/or functions for the computing device 1000 as described herein according to software and/or instructions configured for the computing device 1000. The processor(s) 1002 (e.g., a hardware processor) can execute any type of instructions associated with data to achieve the operations detailed herein. In one example, the processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, the memory element(s) 1004 and/or the storage 1006 is/are configured to store data, information, software, instructions associated with the computing device 1000, and/or logic configured for the memory element(s) 1004 and/or the storage 1006. For example, any logic described herein (e.g., the control logic 1020) can, in various embodiments, be stored for the computing device 1000 using any combination of the memory element(s) 1004 and/or the storage 1006. Note that in some embodiments, the storage 1006 can be consolidated with the memory elements 1004 (or vice versa), or can overlap/exist in any other suitable manner.

In at least one embodiment, the bus 1008 can be configured as an interface that enables one or more elements of the computing device 1000 to communicate in order to exchange information and/or data. The bus 1008 can be implemented with any architecture designed for passing control, data, and/or information between processors, memory elements/storage, peripheral devices, and/or any other hardware and/or software components that may be configured for the computing device 1000. In at least one embodiment, the bus 1008 may be implemented as a fast kernel-hosted interconnect, potentially using shared memory between processes (e.g., logic), which can enable efficient communication paths between the processes.

In various embodiments, the network processor unit(s) 1010 may enable communication between the computing device 1000 and other systems, entities, etc., via the network I/O interface(s) 1012 to facilitate operations discussed for various embodiments described herein. In various embodiments, the network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, the network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or the network I/O interfaces 1012 may include suitable interfaces for receiving, transmitting, and/or otherwise communicating data and/or information in a network environment.

The I/O interface(s) 1014 allow for input and output of data and/or information with other entities that may be connected to computing device 1000. For example, the I/O interface(s) 1014 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, user device, agent device, etc.), the computing device 1000 may further include, or be coupled to, an audio speaker 1022 to convey sound, microphone or other sound sensing device 1024, a camera or image capture device 1026, a keypad or keyboard 1028 to enter information (e.g., alphanumeric information, etc.), and/or a touch screen or other display 1030. These items may be coupled to the bus 1008 or to the I/O interface(s) 1014 to transfer data with other elements of the computing device 1000.

In various embodiments, the control logic 1020 can include instructions that, when executed, cause the processor(s) 1002 to perform operations, which can include, but not be limited to, providing overall control operations of the computing device 1000; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.) and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s) and/or other similar machine, etc. Generally, memory element(s) 1004 and/or storage 1006 can store data, software, code, instructions (e.g., processor instructions), logic, parameters, combinations thereof, and/or the like used for operations described herein. This includes memory elements 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

In some aspects, the techniques described herein relate to a method, including: determining an attitudinal negativity score associated with a contact center agent, among a plurality of contact center agents, based on an interaction between the contact center agent and a user during a communication session; receiving data associated with an incoming user communication; determining a user ease score associated with the incoming user communication based on the data; and blocking routing of the incoming user communication to the contact center agent based on the attitudinal negativity score being above a first threshold score and the user ease score being below a second threshold score.

In some aspects, the techniques described herein relate to a method, further including: receiving additional data associated with an additional incoming user communication; determining an additional user ease score associated with the additional incoming user communication based on the additional data; and forwarding the additional incoming user communication to the contact center agent based on the user ease score being above the second threshold score.

In some aspects, the techniques described herein relate to a method, further including updating the attitudinal negativity score based on an additional interaction between the contact center agent and an additional user during an additional communication session associated with the additional incoming user communication.

In some aspects, the techniques described herein relate to a method, wherein updating the attitudinal negativity score provides an updated attitudinal negativity score that is below the first threshold score, and the method includes forwarding a subsequent incoming user communication to the contact center agent based on the updated attitudinal negativity score being below the first threshold score.

In some aspects, the techniques described herein relate to a method, wherein determining the attitudinal negativity score includes performing emotion detection of audio data related to the interaction between the contact center agent and the user during the communication session, performing sentiment analysis of a textual transcript related to the interaction between the contact center agent and the user during the communication session, or both.

In some aspects, the techniques described herein relate to a method, wherein the data associated with the incoming user communication includes an issue of the incoming user communication, historical information related to an additional user of the incoming user communication, a detected emotion of the additional user, or any combination thereof.

In some aspects, the techniques described herein relate to a method, further including blocking routing of an additional incoming user communication to the contact center agent for a threshold duration of time based on the attitudinal negativity score being above the first threshold score.

In some aspects, the techniques described herein relate to a method, including: determining a first attitudinal negativity score associated with a first agent of a plurality of agents; determining a user ease score associated with an incoming user communication; blocking routing of the incoming user communication to the first agent based on the first attitudinal negativity score being above a first threshold score and the user ease score being below a second threshold score; determining a second attitudinal negativity score associated with a second agent of the plurality of agents; and forwarding the incoming user communication to the second agent based on the second attitudinal negativity score being below the first threshold score.

In some aspects, the techniques described herein relate to a method, further including determining the second attitudinal negativity score associated with the second agent in response to blocking routing of the incoming user communication to the first agent.

In some aspects, the techniques described herein relate to a method, wherein forwarding the incoming user communication to the second agent includes establishing a communication session between the second agent and a user of the incoming user communication, and wherein the method further includes updating the second attitudinal negativity score associated with the second agent based on an interaction between the second agent and the user during the communication session.

In some aspects, the techniques described herein relate to a method, wherein updating the second attitudinal negativity score associated with the second agent based on the interaction between the second agent and the user during the communication session includes increasing the second attitudinal negativity score above the second threshold score, and the method further includes blocking routing of an additional incoming user communication to the second agent for a duration of time in response to increasing the second attitudinal negativity score above the second threshold score.

In some aspects, the techniques described herein relate to a method, further including: determining an additional user ease score associated with an additional incoming user communication; and forwarding the additional incoming user communication to the first agent based on the additional user ease score being above the second threshold score.

In some aspects, the techniques described herein relate to a method, wherein determining the user ease score associated with the incoming user communication includes: identifying a user of the incoming user communication; determining an emotion of the user in a previous communication session; and determining the user ease score based on the emotion of the user in the previous communication session.

In some aspects, the techniques described herein relate to a method, further including providing a notification to a supervisor of the first agent in response to determining the first attitudinal negativity score associated with the first agent is above the first threshold score.

In some aspects, the techniques described herein relate to a non-transitory computer-readable medium including instructions that, when executed by one or more processors, are configured to cause the one or more processors to perform operations including: determining an attitudinal negativity score associated with an agent of a plurality of agents; determining a user ease score associated with an incoming user communication; forwarding the incoming user communication to the agent based on the attitudinal negativity score being below a first threshold score, the user ease score being above a second threshold score, or both; and blocking routing of the incoming user communication to the agent based on the attitudinal negativity score being above the first threshold score and the user ease score being below the second threshold score.

In some aspects, the techniques described herein relate to a non-transitory computer-readable medium, wherein the instructions, when executed by the one or more processors, are configured to cause the one or more processors to determine the user ease score associated with the incoming user communication based on an interaction between a user of the incoming user communication and an interactive voice response system.

In some aspects, the techniques described herein relate to a non-transitory computer-readable medium, wherein the instructions, when executed by the one or more processors, are configured to cause the one or more processors to provide a resource to the agent in response to determining the attitudinal negativity score is above the first threshold score.

In some aspects, the techniques described herein relate to a non-transitory computer-readable medium, wherein the instructions, when executed by the one or more processors, are configured to cause the one or more processors to perform operations further including: establishing a communication session between the agent and a user of the incoming user communication upon forwarding the incoming user communication to the agent; determining an emotion of the user based on an interaction between the agent and the user during the communication session; and storing the emotion in association with the user in a database.

In some aspects, the techniques described herein relate to a non-transitory computer-readable medium, wherein the instructions, when executed by the one or more processors, are configured to cause the one or more processors to perform operations further including: receiving an additional incoming user communication; determining the user is of the incoming user communication and of the additional incoming user communication; and determining an additional user ease score associated with the additional incoming user communication based on the emotion in association with the user stored in the database.

In some aspects, the techniques described herein relate to a non-transitory computer-readable medium, wherein the instructions, when executed by the one or more processors, are configured to cause the one or more processors to perform operations further including: determining that a respective attitudinal negativity score of each agent of the plurality of agents is above the first threshold score; block routing of the incoming user communication to each agent of the plurality of agents based on the respective attitudinal negativity score of each agent being above the first threshold score; identifying a supervisor of one of the plurality of agents in response to determining that the respective attitudinal negativity score of each agent of the plurality of agents is above the first threshold score; and routing the incoming user communication to the supervisor.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any LAN, Virtual LAN (VLAN), WAN (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method, comprising:

determining an attitudinal negativity score associated with a contact center agent, among a plurality of contact center agents, based on an interaction between the contact center agent and a user during a communication session;

receiving first data associated with a first incoming user communication;

determining a first user ease score associated with the first incoming user communication based on the first data indicating a first issue associated with the first incoming user communication;

blocking routing of the first incoming user communication to the contact center agent based on the attitudinal negativity score being above a first threshold score and the first user ease score being below a second threshold score;

receiving second data associated with a second incoming user communication;

determining a second user ease score associated with the second incoming user communication based on the second data indicating a second issue, different from the first issue, associated with the second incoming user communication;

determining the second user ease score associated with the second incoming user communication based on the second data indicating an emotion of an additional user associated with the second incoming user communication;

decreasing the second user ease score by a first amount based on the emotion of the additional user but increasing the second user ease score by a second, higher amount based on the second issue associated with the second incoming user communication such that the second user ease score is above the second threshold score; and routing the second incoming user communication to the contact center agent based on the attitudinal negativity score being above the first threshold score but the second user ease score being above the second threshold score.

2. The method of claim 1, further comprising updating the attitudinal negativity score based on an additional interaction between the contact center agent and the additional user during an additional communication session associated with the second incoming user communication.

3. The method of claim 2, wherein updating the attitudinal negativity score provides an updated attitudinal negativity score that is below the first threshold score, and the method comprises forwarding a subsequent incoming user communication to the contact center agent based on the updated attitudinal negativity score being below the first threshold score.

4. The method of claim 1, wherein determining the attitudinal negativity score comprises performing emotion detection of audio data related to the interaction between the contact center agent and the user during the communication session, performing sentiment analysis of a textual transcript related to the interaction between the contact center agent and the user during the communication session, or both.

5. The method of claim 1, wherein the first data associated with the first incoming user communication comprises historical information related to an initial user of the first incoming user communication, a detected emotion of the initial user, or any combination thereof.

6. The method of claim 1, further comprising blocking routing of an additional incoming user communication to the contact center agent for a threshold duration of time based on the attitudinal negativity score being above the first threshold score.

7. A method, comprising:

determining a first attitudinal negativity score associated with a first agent of a plurality of agents;

determining a user ease score associated with an incoming user communication;

blocking routing of the incoming user communication to the first agent based on the first attitudinal negativity score being above a first threshold score and the user ease score being below a second threshold score;

determining a second attitudinal negativity score associated with a second agent of the plurality of agents;

blocking routing of the incoming user communication to the second agent based on the second attitudinal negativity score being above the first threshold score and the user ease score being below the second threshold score;

identifying a supervisor of the first agent, of the second agent, or both, in response to blocking routing of the incoming user communication to the first agent and to the second agent; and routing the incoming user communication to the supervisor.

8. The method of claim 7, further comprising determining the second attitudinal negativity score associated with the second agent in response to blocking routing of the incoming user communication to the first agent.

9. The method of claim 7, further comprising:

determining an additional user ease score associated with an additional incoming user communication; and forwarding the additional incoming user communication to the first agent based on the additional user ease score being above the second threshold score.

10. The method of claim 7, wherein determining the user ease score associated with the incoming user communication comprises:

identifying a user of the incoming user communication;

determining an emotion of the user in a previous communication session; and determining the user ease score based on the emotion of the user in the previous communication session.

11. The method of claim 7, further comprising providing a notification to the supervisor of the first agent in response to determining the first attitudinal negativity score associated with the first agent is above the first threshold score.

12. A non-transitory computer-readable medium comprising instructions that, when executed by one or more processors, are configured to cause the one or more processors to perform operations comprising:

determining a respective attitudinal negativity score associated with each agent of a plurality of agents;

blocking routing of an incoming user communication to each agent of the plurality of agents based on the respective attitudinal negativity score of each agent being above a threshold score;

identifying a supervisor of one of the plurality of agents in response to determining that the respective attitudinal negativity score of each agent is above the threshold score; and routing the incoming user communication to the supervisor.

13. The non-transitory computer-readable medium of claim 12, wherein the instructions, when executed by the one or more processors, are configured to cause the one or more processors to determine a user ease score associated with the incoming user communication based on an interaction between a user of the incoming user communication and an interactive voice response system.

14. The non-transitory computer-readable medium of claim 12, wherein the instructions, when executed by the one or more processors, are configured to cause the one or more processors to provide a resource to an agent of the plurality of agents in response to determining the respective attitudinal negativity score of the agent is above the threshold score.

15. The non-transitory computer-readable medium of claim 12, wherein the instructions, when executed by the one or more processors, are configured to cause the one or more processors to perform operations further comprising:

forwarding an additional incoming user communication to an agent of the plurality of agents in response to determining the respective attitudinal negativity score of the agent is below the threshold score;

establishing a communication session between the agent and a user of the additional incoming user communication upon forwarding the additional incoming user communication to the agent;

determining an emotion of the user based on an interaction between the agent and the user during the communication session; and storing the emotion in association with the user in a database.

16. The non-transitory computer-readable medium of claim 15, wherein the instructions, when executed by the one or more processors, are configured to cause the one or more processors to perform operations further comprising:

receiving a subsequent incoming user communication;

determining the user is of the additional incoming user communication and of the subsequent incoming user communication; and determining an additional user ease score associated with the subsequent incoming user communication based on the emotion in association with the user stored in the database.

17. The method of claim 1, comprising:

determining the second user ease score associated with the second incoming user communication based on the second data indicating an identification of an additional user associated with the second incoming user communication; and decreasing the second user ease score based on the identification of the additional user but increasing the second user ease score based on the second issue associated with the second incoming user communication such that the second user ease score is above the second threshold score.

18. The non-transitory computer-readable medium of claim 13, wherein the instructions, when executed by the one or more processors, are configured to cause the one or more processors to perform operations further comprising blocking routing of the incoming user communication to an agent of the plurality of agents based on the user ease score being below an additional threshold score.

19. The non-transitory computer-readable medium of claim 13, wherein the instructions, when executed by the one or more processors, are configured to cause the one or more processors to perform operations further comprising routing the incoming user communication to an agent of the plurality of agents based on the user ease score being above an additional threshold score.

20. The method of claim 1, comprising:

identifying a supervisor of the contact center agent in response to blocking routing of the first incoming user communication to the contact center agent; and routing the first incoming user communication to the supervisor.

* * * * *